United States Patent
Braun

[19]

[11] Patent Number: 6,007,108
[45] Date of Patent: Dec. 28, 1999

[54] ADAPTER FOR A NOZZLE MANIFOLD OF A HOT RUNNER SYSTEM

[75] Inventor: Peter Braun, Hungen, Germany

[73] Assignee: Ewikon Heisskanalsysteme GmbH & Co. KG, Kirchlengern, Germany

[21] Appl. No.: 08/978,860

[22] Filed: Nov. 26, 1997

[30] Foreign Application Priority Data

Nov. 29, 1996 [DE] Germany ............................ 196 49 621

[51] Int. Cl.⁶ .................................................. F16L 43/00
[52] U.S. Cl. ........................ 285/125.1; 285/179; 285/339; 285/359; 285/133.11; 425/549
[58] Field of Search .................................. 285/125.1, 179, 285/421, 339, 394, 395, 305, 359, 358, 133.11; 425/549, 548

[56] References Cited

U.S. PATENT DOCUMENTS

| | | | |
|---|---|---|---|
| 4,609,138 | 9/1986 | Harrison | 228/161 |
| 4,690,437 | 9/1987 | Anderson | 285/356 |
| 5,366,369 | 11/1994 | Gellert | 425/549 |
| 5,441,197 | 8/1995 | Gellert et al. | 228/248.1 |

FOREIGN PATENT DOCUMENTS

| | | |
|---|---|---|
| 0 226 798 | 1/1987 | European Pat. Off. . |
| 4-131582 | 5/1992 | Japan ..................................... 285/381 |

*Primary Examiner*—Chuck Y. Mah
*Assistant Examiner*—Alison K. Pickard
*Attorney, Agent, or Firm*—Henry M. Feiereisen

[57] ABSTRACT

An adapter for use with a nozzle manifold of a hot runner injection molding system for fluidly connecting at least two runner sections and thereby distribute and conduct melt to cavities of an injection mold, includes a plug having at least one end face formed with a first opening for fluid connection to one runner section and a cylindrical or conical wall surface formed with a second opening for fluid connection to another runner section and extending at an angle with respect to the one end face, and a force-applying unit so acting upon the plug as to urge the end face and the wall surface into a fluid-tight pressure fit upon mating surfaces of the nozzle manifold.

7 Claims, 5 Drawing Sheets

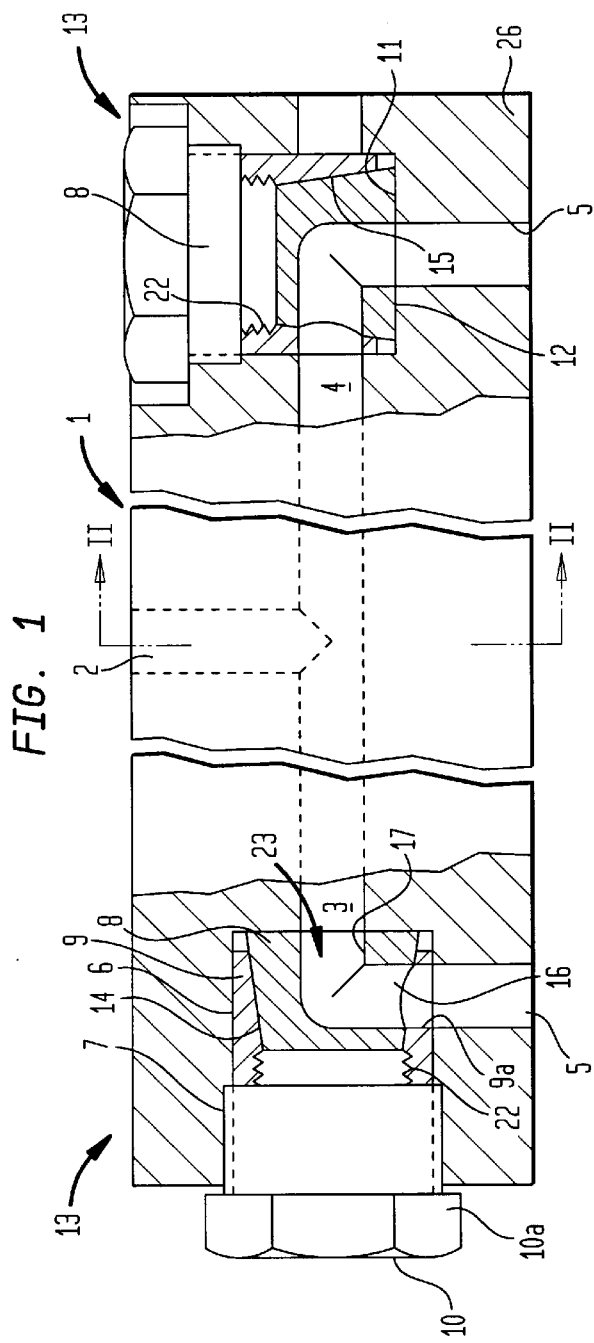
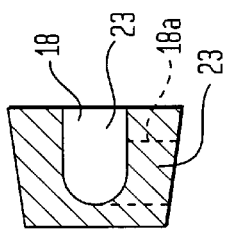
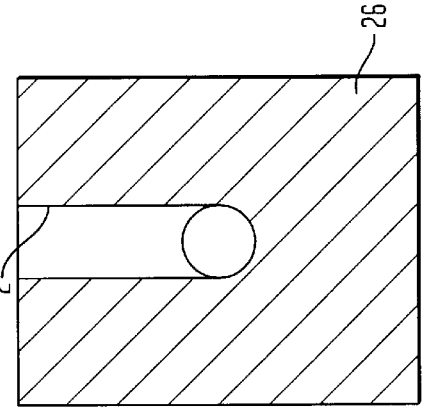

ADAPTER FOR A NOZZLE MANIFOLD OF A HOT RUNNER SYSTEM

BACKGROUND OF THE INVENTION

The present invention refers generally to an adapter for connecting at least two runner sections of a nozzle manifold of a hot runner injection molding system for distributing and conducting a flow of melt to the cavities or hot runner nozzles. More specifically, the present invention refers to an adapter of a type having a preferably rotationally symmetrical body exhibiting at least one end face connected to one of the runner sections and a cylindrical or conical wall surface connected to another runner section and extending at an angle with respect to the one end face.

Adapters of this type are known in a variety of designs, e.g. in European Patent Specification No. 0 226 798. Of interest are in particular those adapters for fluidly connecting runner sections of a hot runner system in a fluid-tight manner whereby the runner sections are aligned and/or angled to one another.

In general, conventional adapters have the disadvantage that one end of the runner section, e.g. the melt inlet opening or melt outlet opening, is formed in the flat end face while the second end exits at the cylindrical surface of the adapter. Although, conventional adapters can be so designed as to allow a sealing of mating plane surfaces of the adapter and the nozzle manifold by tightly clamping the adapter to the manifold body by means of suitable screw threads, such screw threads act however in only one direction so that the fluid-tightness of the cylindrical outer adapter surfaces depends solely on the quality of the fit between both sections whereby the fit should be so designed as to allow an easy disassembly of the adapter for cleaning purposes as well.

SUMMARY OF THE INVENTION

It is thus an object of the present invention to provide an improved adapter for runner sections of a hot runner injection molding system, obviating the afore-stated drawbacks.

In particular, it is an object of the present invention to provide an improved adapter which can be so installed as to effect a fluid-tight seal with the adjoining structure between mating surfaces in the area of the end face as well as in the area of the cylindrical surface even at the high pressure exerted by the melt.

These objects and others which will become apparent hereinafter are attained in accordance with the present invention by providing a plug having at least one end face formed with a first opening for fluid connection to one runner section and an arcuated, e.g. cylindrical or conical, wall surface formed with a second opening for fluid connection to another runner section and extending at an angle with respect to the one end face, and a force-applying unit so acting upon the plug as to urge the end face and the wall surface into a fluid-tight pressure fit upon mating surfaces of the nozzle manifold.

Preferably, the force-applying element so interacts with the plug as to effect upon actuation a pressure seal of the end face and at the same time of the wall surface upon mating surfaces of the nozzle manifold.

According to another feature of the present invention, the plug is of truncated cone shape, with the end face having a greater dimension than an opposing end face, with the force-applying unit including a sleeve surrounding the plug and a pressure-exerting element, such as a screw fastener, insertable from outside for so pressing the sleeve against the plug as to generate between mating conical surfaces of the plug and the sleeve a first force component actuating in direction toward the end face, and a second force component actuating in direction toward the wall surface.

According to still another feature of the present invention, the sleeve is a double cone for cooperation with the plug in the form of a cone, with the pressure-exerting element acting upon the plug.

BRIEF DESCRIPTION OF THE DRAWING

The above and other objects, features and advantages of the present invention will now be described in more detail with reference to the accompanying drawing in which:

FIG. 1 is a partially longitudinal section of a nozzle manifold having incorporated therein one embodiment of adapters according to the present invention;

FIG. 2 is a cross section of the nozzle manifold, taken along the line II—II of FIG. 1;

FIG. 3 is a sectional view of a semi-finished adapter with incomplete channel for use in the nozzle manifold;

DETAILED DESCRIPTION OF PREFERRED EMBODIMENTS

Figure 4:
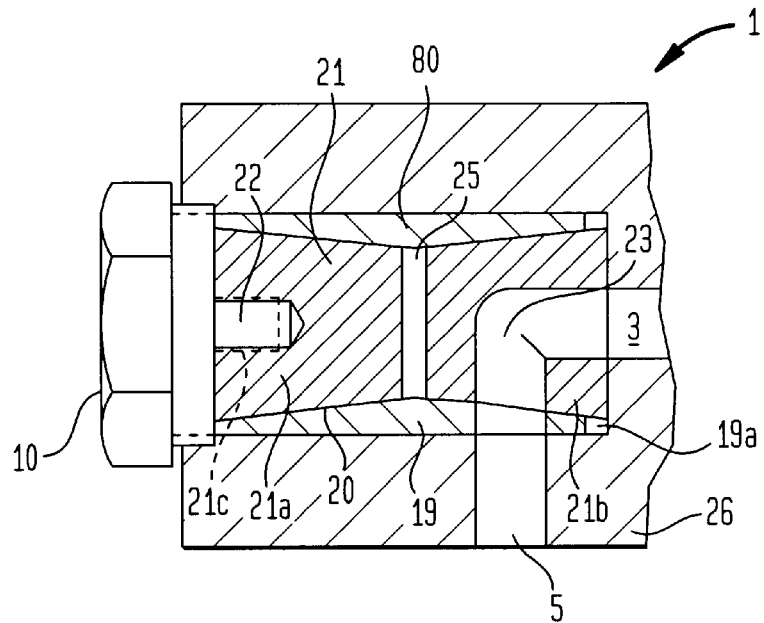
FIG. 4 is a sectional view of the left hand side of the nozzle manifold having incorporated therein a modified adapter.

Throughout all the Figures, the same or corresponding elements are generally indicated by the same reference numerals.

Turning now to the drawing, and in particular to FIG. 1, there is shown a partially sectional view of a nozzle manifold, generally designated by reference numeral 1 and including a main body 26 formed centrally with an inlet channel 2 which is fluidly connected to two runners 3, 4 extending perpendicular to the inlet channel 2 for conducting melt toward axially opposite end regions 13 of the main body 26. In the end regions 13 of the nozzle manifold 1, the runners 3, 4 terminate in respective adapters, generally designated by reference numeral 8 and insertable in respective bores 6 of the main body 26 for connection of the runners 3, 4 to a continuing passageway. In the non-limiting example of FIG. 1, the adapters 8 are so configured as to change the direction of melt flow in a direction parallel to the inlet channel 2 and to direct the melt flow through outlets 5, whereby each adapter 8 rests with its flat end face 12 upon a flat end face 11 of the main body 26.

Persons skilled in the art will understand that within the scope of the present invention, it is not critical at which end the melt enters or exits the adapter. For ease of understanding, it is assumed however that in the non-limiting example of FIG. 1 and in the following examples, the melt enters at the end face of the adapter and exits at the peripheral surface area of the adapter.

As shown in FIG. 1, the adapter 8 includes a plug 14 of truncated cone shape and a sleeve 9 which surrounds the plug 14 and is formed with an inner conical bore 15 complementing the conical shape of the plug 14. The plug 14 is formed with an elbow-shaped passageway 23 formed by a horizontal channel 17 extending inwardly from the plane end face 11 and a vertical channel 16 in fluid communication with the channel 17 for conducting a melt flow from a substantial horizontal direction to a substantially vertical direction, with the sleeve 9 being formed with a bore 9a in alignment with the channel 16 for connection to the passageway or outlet 5. The sleeve 9 has a relatively thin wall thickness to exhibit a certain resiliency which effects a press-fit between the mating plane surfaces 11, 12 while enabling the sleeve 9 as a consequence of an elastic deformation to wedge between its outer surface area and the inside wall surface of the bore 6 when tightening a screw fastener 10. Thus, a tightening of the screw fastener 10 enables a fluid-tight pressure seal in both critical directions, i.e. at the interface between mating plane surfaces 11, 12 and the interface between outer sleeve surface and inner bore surface.

It will be understood by persons skilled in the art that the plug 14 and/or the sleeve 9 of the adapter 8 may be made available as standardized components, without formation of the channel section 16 but with formation of a concentric recess 18, as shown in FIG. 3 which illustrates the adapter 8 in a semifinished state. The plug 14 of the semifinished adapter is initially formed with a recess 18 that constitutes part of the channel 23. When assembling the nozzle manifold 1, the semifinished adapter is placed together with the sleeve 9 in the bore 6, and subsequently the channels 16, 17 are formed via outlet 5, e.g. by drilling or milling the area shown in broken line and denoted by reference numeral 18a in FIG. 3.

If e.g. a cleaning of the nozzle manifold 1 is intended, the adapter 8 can easily be removed by unscrewing the screw fastener 10. However, the removed adapter 8 will not be reused again but substituted by a new adapter for proper flush engagement of the outlet 5 and the channel section 16 without any misalignments.

FIG. 1 shows the nozzle manifold 1 of such configuration that on the left hand side, melt enters the adapter 8 from the runner 3 through the end face 11 while on the right hand side the runner 4 enters the adapter 8 through the outer surface area of the plug 14.

The screw fastener 10 is formed with a head 10a and a shank 7 that interacts with the sleeve 9. The plug 14 and/or the sleeve 9 of each adapter 8 may be formed with a thread 22 or the like to allow their withdrawal from the nozzle manifold 1 by means of a suitable tool, i.e. initially the sleeve 9 can be pulled out with the screw fastener 10 to allow access for an ejector tool (not shown) to remove the plug 14 from the bore 6.

FIG. 4 is a sectional view of the left hand side of a nozzle manifold 1, having incorporated therein a modified adapter, generally designated by reference numeral 80 and including a plug 21 in the form of two cones 21a, 21b in side-by-side disposition to resemble a bow-tie configuration, with a gap 25 being formed between the cones 21a, 21b. A sleeve 19 surrounds the plug 21 and is formed with an inside surface 20 shaped in the form of a double cone to complement the tapered configuration of the plug 21. The runner-proximal cone 21b of the plug 21 accommodates the channel 23 which extends in alignment with the runner 3 and via a bore 19a of the sleeve 19 with the outlet 5. A clamping element, such as screw fastener 10, is threadably engageable in a bore 21c of the cone 21a to force the plug 21 into the sleeve 19 and thereby effect a wedging action of the sleeve 19 between mating surfaces of the sleeve 19 and the main body 26, in a manner as described above in conjunction with the embodiment of FIG. 1, to effect the fluid-tightness. As a consequence of the double cone configuration of the sleeve 19, a radial sealing action is additionally effected.

Figure 5:
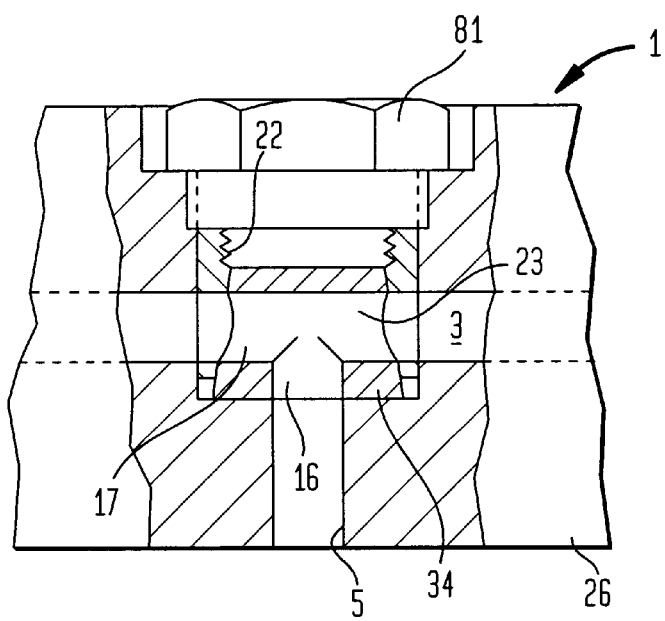
FIG. 5 is a sectional view of a modified nozzle manifold having incorporated therein another embodiment of an adapter formed with several inlets and/or outlets.

FIG. 5 is a sectional view of a modified nozzle manifold 1 having incorporated therein another embodiment of an adapter, generally designated by reference numeral 81 and including a plug 34 having incorporated therein the channel 23 with channel section 16, 17 which are so configured as to form a T so as to exhibit several inlets or outlets. Although the horizontal channel section 17 is shown in flush configuration, persons skilled in the art will understand that the channel section 17 may also be composed of segments extending at an angle to one another.

Figure 6:
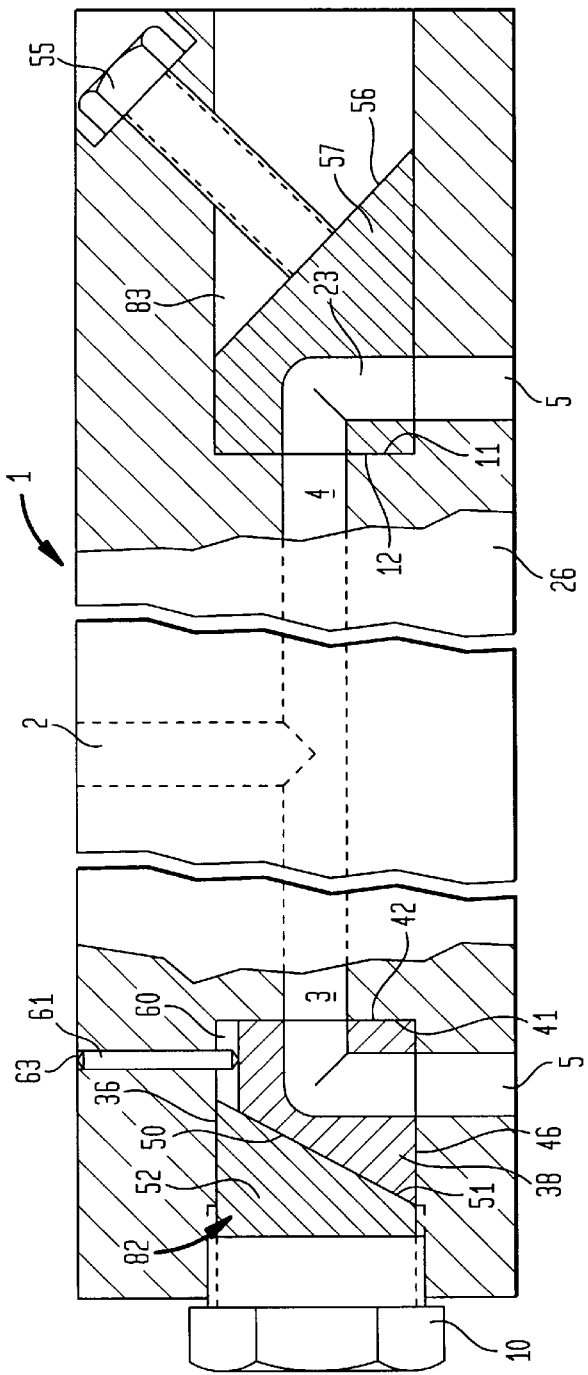
FIG. 6 is a partially longitudinal section of a nozzle manifold having incorporated therein different configurations of adapters according to the present invention.
Figure 7:
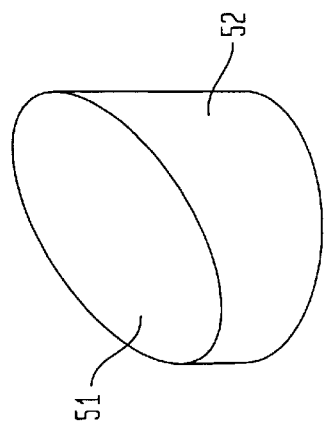
FIG. 7 is a schematic perspective view of a pressure-exerting member for interaction with an adapter.

FIG. 6 is a partially longitudinal section of a nozzle manifold 1, having incorporated therein different configurations of adapters according to the present invention, generally designated by reference numerals 82, 83. The adapter 82 on the left hand side of the hot nozzle manifold 1 includes a plug 38 which has a plane surface 41 bearing upon the plane surface 42 of the main body 26. At a distance in opposition to the plane surface 41, the plug 38 has a further plane surface 50 which extends at an acute angle to the central axis of the adapter 82. Bearing upon the plug 38 is a compressor 52 which is formed with a sloped surface 51, as best seen in FIG. 7, to complement the plane surface 50 of the plug 38. Upon tightening a screw fastener 10, a wedge action is used between the mating surfaces 50, 51 to force the plug 38, depending on the selected angle of surfaces 50, 51 against the plane surface 42 as well as against the bore wall 46 flanking the outlet 5.

As further shown in FIG. 6, the plug 38 is formed with a recess 60, and the main body 26 is provided with a through-bore 63 for receiving a pin 61 which projects into the recess 60 so as to ensure a precise positional installation of the adapter 82. Persons skilled in the art will understand that the provision of a pin is only an exemplary way of attaining an accurate positioning of the adapter 82. It is certainly within the scope of the present invention to provide the inside wall 36 of the bore 6 with a protusion that juts into the recess 60.

The adapter 83 on the right hand side includes a plug 57 which is formed with a plane surface 11 flanking the channel 23 in opposition to the plane surface 12 of the main body 26, and a slanted surface 56 in opposition to the plane surface 11. A pressure-exerting member in the form of a screw fastener 55 directly acts with its shank upon the slanted surface 56 to exert the pressure needed to effect a fluid-tight seal between the mating surfaces 11, 12 and at the interface between the plug 57 and the main body 26 in the area of the outlet 5. Suitably, the screw fastener 55 is completely embedded in the main body 26.

Figure 8:
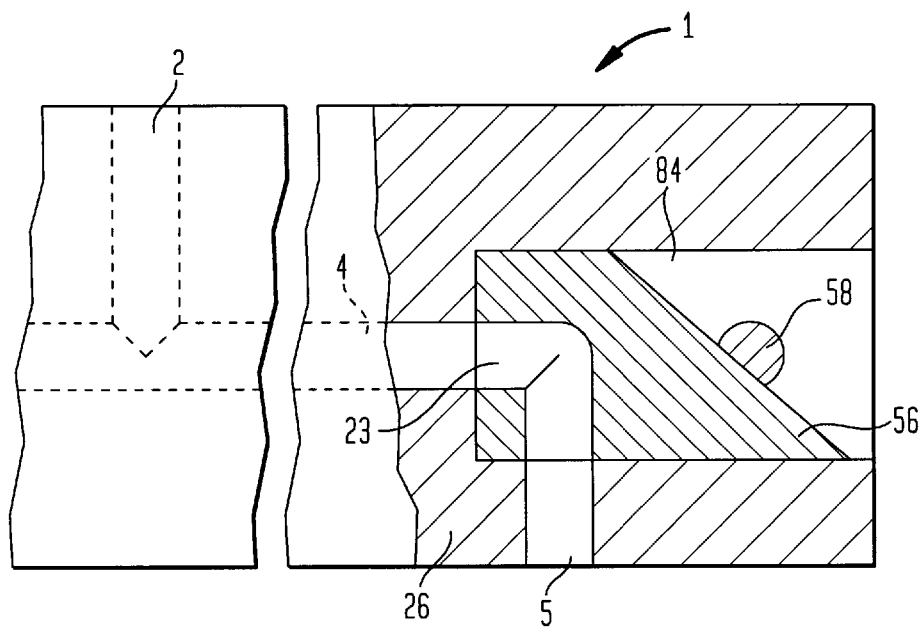
FIG. 8 is a sectional view of the right hand side of a nozzle manifold having incorporated therein still another embodiment of an adapter according to the present invention.
Figure 9:
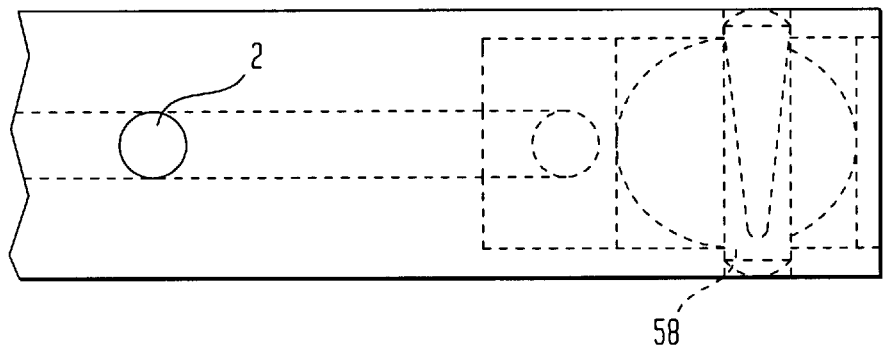
FIG. 9 is a top view of the nozzle manifold of FIG. 8.
Figure 9A:
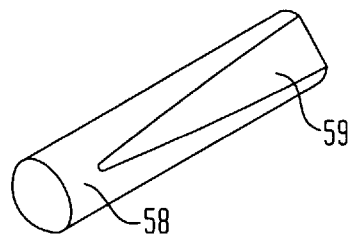
FIG. 9a is a perspective illustration of a clamping pin.

FIG. 8 is a sectional view of the right hand side of a nozzle manifold 1, having incorporated therein still another embodiment of an adapter according to the present invention, generally designated by reference numeral 84, which differs from the adapter 83 in the configuration of the pressure-exerting member. As best seen in conjunction with FIGS. 9 and 9a, the pressure-exerting member is provided in the form of a pin 58 which is formed with a clamping surface 59 and driven from one side into the plug 56 to exert the high contact pressure and thereby effect the pressure seal between the mating surfaces.

Figure 10:
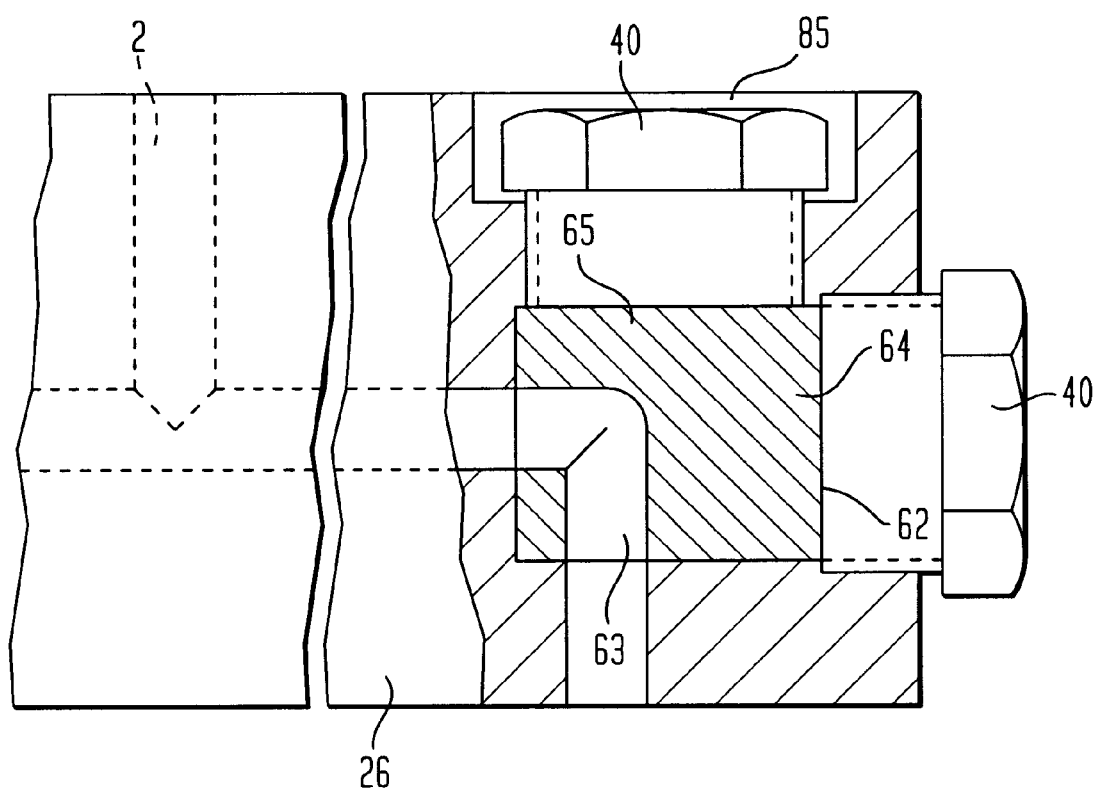
FIG. 10 is a sectional view of the right hand side of a nozzle manifold having incorporated therein yet another embodiment of an adapter according to the present invention, provided with separate clamping members.

Turning now to FIG. 10, there is shown a sectional view of the right hand side of a nozzle manifold 1, having incorporated therein yet another embodiment of an adapter according to the present invention, generally designated by reference numeral 85 and including a plug 64 which is acted upon on end faces 63 and 65 by separate pressure-exerting members in the form of screws 40.

While the invention has been illustrated and described as embodied in an adapter for a nozzle manifold of a hot runner system, it is not intended to be limited to the details shown since various modifications and structural changes may be made without departing in any way from the spirit of the present invention.

What is claimed as new and desired to be protected by letters patent is set forth in the appended claims:

1. An adapter for use with a nozzle manifold of a hot runner injection molding system for fluidly connecting at least two runner sections and thereby distribute and conduct melt to cavities of an injection mold, said adapter comprising:

a plug having at least one end face formed with a first opening for fluid connection to one runner section and an arcuated wall surface formed with a second opening for fluid connection to another runner section and positioned at an angle with respect to the one end face; and a force-applying means so acting upon the plug as to urge the end face and the wall surface into a fluid-tight pressure fit upon mating surfaces of a nozzle manifold, said force-applying means including a sleeve surrounding the plug and a pressure-exerting element insertable from outside for so pressing the sleeve against the plug as to generate between mating surfaces of the plug and the sleeve a first force component in direction toward the end face, and a second force component in direction toward the wall surface.

2. The adapter of claim 1 wherein the force-applying means so interacts with the plug as to effect upon actuation a pressure seal of the end face and at the same time of the wall surface upon mating surfaces of the nozzle manifold.

3. The adapter of claim 1 wherein the pressure-exerting element is a screw fastener.

4. The adapter of claim 1 wherein the sleeve is a double cone for cooperation with the plug, said pressure-exerting element acting upon the plug.

5. The adapter of claim 1 wherein at least one element selected from the group consisting of plug and sleeve has removal means for allowing cooperation with an ejection tool.

6. The adapter of claim 5 wherein the removal means is a thread.

7. The adapter of claim 1 wherein the plug is of truncated cone shape, with the end face having a greater dimension than an opposing end face.

* * * * *